(12) United States Patent
Pihet et al.

(10) Patent No.: US 7,178,070 B2
(45) Date of Patent: Feb. 13, 2007

(54) CIRCUIT CONFIGURATION AND METHOD FOR MONITORING A MICRO-CONTROLLER

(75) Inventors: Eric Pihet, München (DE); Josef Gerner, Moosburg (DE)

(73) Assignee: Infineon Technologies AG, Munich (DE)

( * ) Notice: Subject to any disclaimer, the term of this patent is extended or adjusted under 35 U.S.C. 154(b) by 538 days.

(21) Appl. No.: 10/446,492

(22) Filed: May 28, 2003

(65) Prior Publication Data

US 2003/0233156 A1 Dec. 18, 2003

(30) Foreign Application Priority Data

May 28, 2002 (DE) .............................. 102 23 773

(51) Int. Cl.
*G06F 11/00* (2006.01)
(52) U.S. Cl. ........................................................ 714/55
(58) Field of Classification Search ................. 714/51, 714/55
See application file for complete search history.

(56) References Cited

U.S. PATENT DOCUMENTS 6,587,966 B1 *  7/2003  Chaiken et al. ............... 714/34
6,697,973 B1 *  2/2004  Baumeister et al. .......... 714/55
2003/0079152 A1 *  4/2003  Triece ........................ 713/322
2003/0197993 A1 * 10/2003  Mirowski et al. .......... 361/93.2

FOREIGN PATENT DOCUMENTS

DE  43 29 872 C2   3/1995
DE  196 11 942 A1  10/1997

OTHER PUBLICATIONS

Infineon Technologies: "Fault Tolerant CAN-LDO", *TLE 6262 G, Final Data Sheet, version 2.01*, dated Feb. 12, 2002, pp. 1-37.

* cited by examiner

*Primary Examiner*—Robert W. Beausoliel
*Assistant Examiner*—Matthew Urick
(74) *Attorney, Agent, or Firm*—Laurence A. Greenberg; Werner H. Stemer; Ralph E. Locher

(57) ABSTRACT

The invention relates to a method for monitoring a microcontroller having at least one normal operating state and one state with a reduced power consumption and to a circuit configuration for carrying out the method. The method enables the functionality of the microcontroller to be monitored even in the state with the reduced power consumption. The method includes steps of: during the normal operating state, receiving a status signal having pulses from the microcontroller and resetting the microcontroller if the pulses are not received within a predefined time pattern; and during the state with the reduced power consumption, transmitting a wakeup signal having a sequence of pulses to the microcontroller, and resetting the microcontroller if there is no confirmation by the microcontroller within a predefined time interval after a pulse of the wakeup signal.

8 Claims, 3 Drawing Sheets

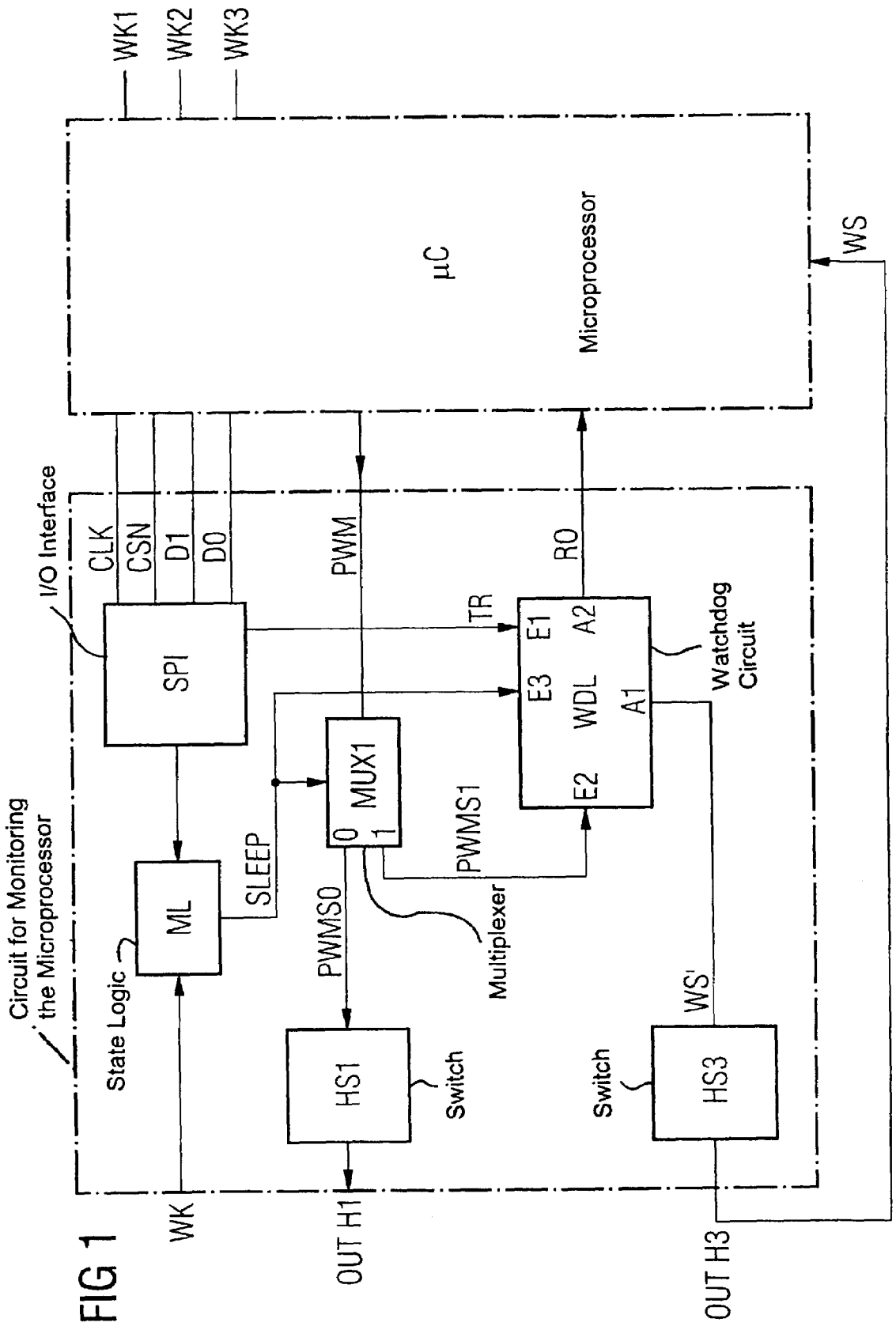

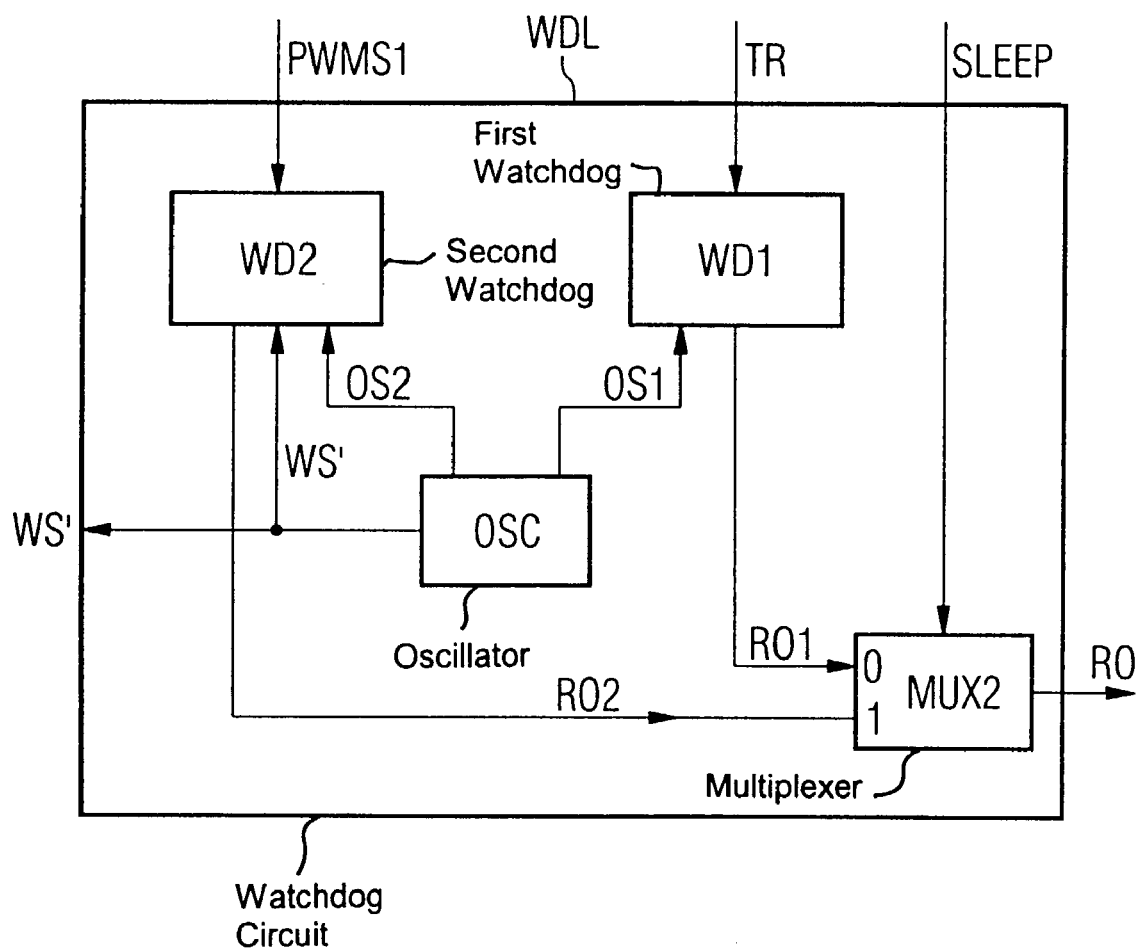

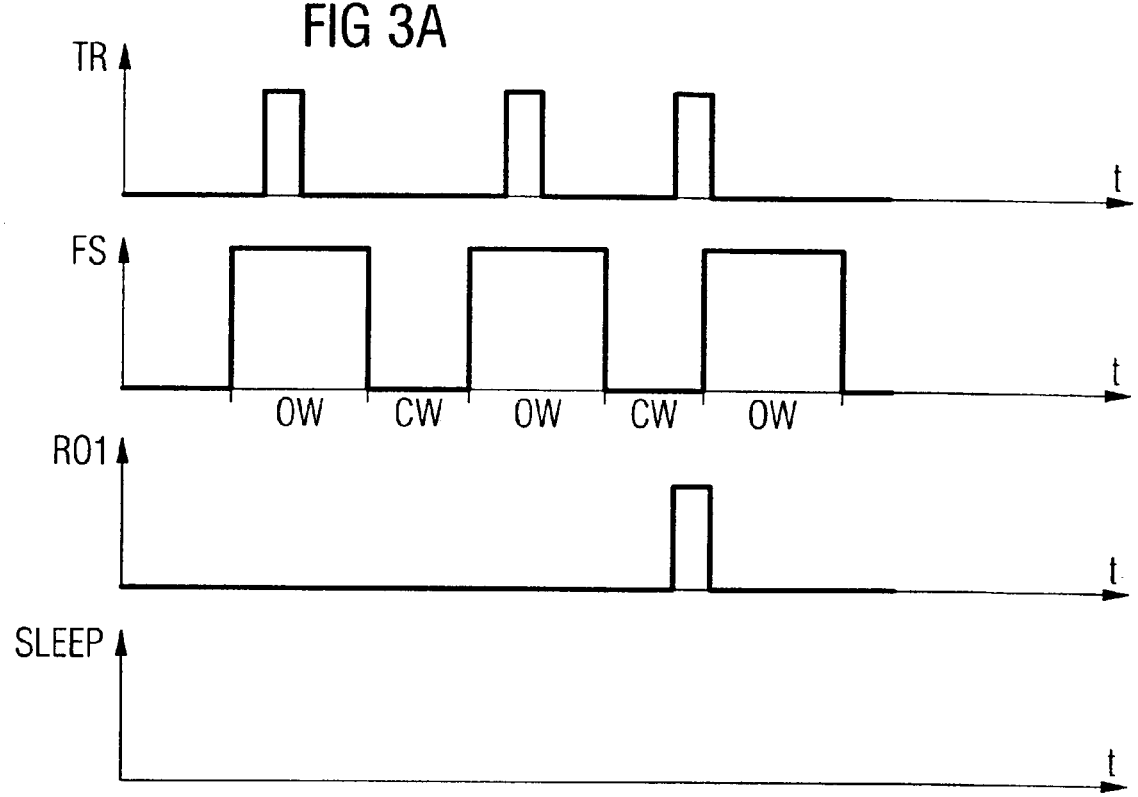
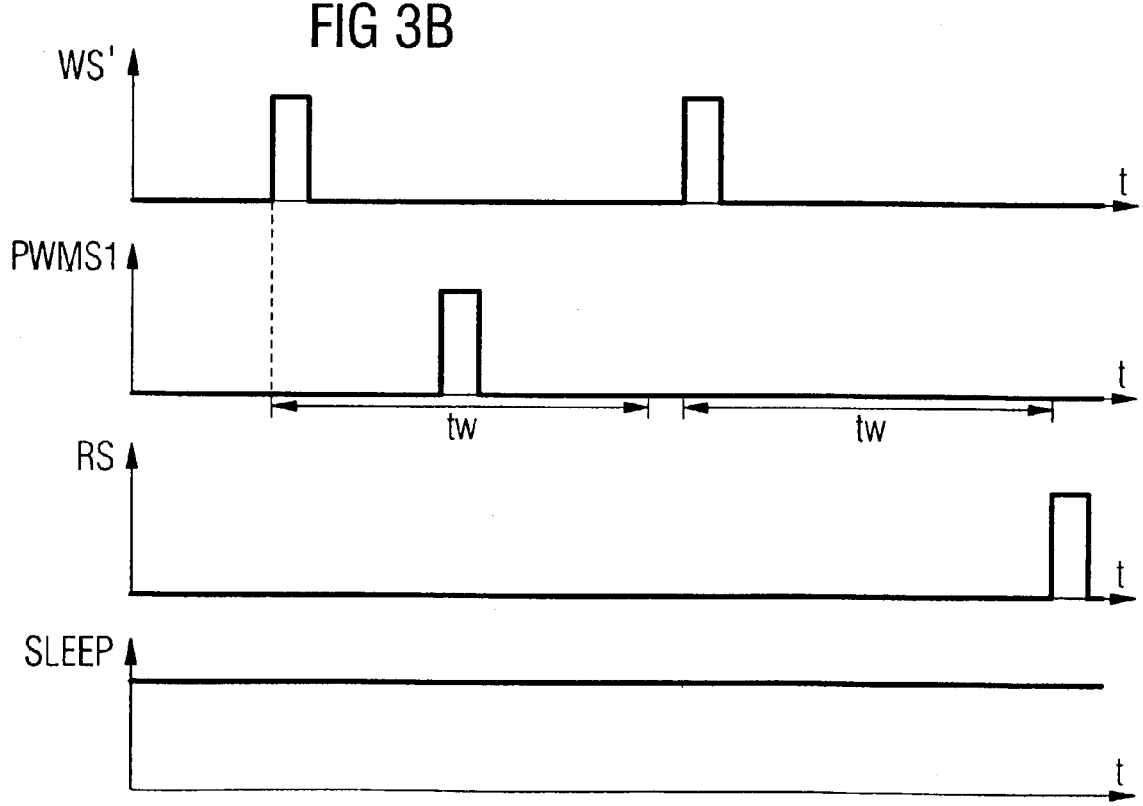

CIRCUIT CONFIGURATION AND METHOD FOR MONITORING A MICRO-CONTROLLER

BACKGROUND OF THE INVENTION

Field of the Invention

The present invention relates to a circuit configuration and a method for monitoring a microcontroller.

The functional capability of microcontrollers for safety-related applications is required to be monitored at regular intervals. For this purpose, the micro-controller is usually configured in such a way that it outputs, at regular time intervals, a status signal that is fed to what is referred to as a watchdog circuit in an external circuit that monitors the microcontroller. The watchdog circuit checks whether the status signal is present within a predefined time pattern. If it is not, it is assumed that there is a fault in the microcontroller and the microcontroller is reset by the watchdog circuit.

An example of such a circuit configuration that has a watchdog circuit for monitoring a microcontroller connected to the circuit configuration is the integrated module TLE 6262 G manufactured by the assignee of this the applicant, which is described in the product information article: "TLE 6262 G, Fault Tolerant LDO", Version 2.01, 12.2.2002. This module is used not only for monitoring the microcontroller for faults with respect to its voltage supply, but also as a CAN (Controller Area Network) transceiver of the micro-controller.

The TLE 6262 G can assume both a normal operating state and a state with a relatively low power consumption in order to cope with requirements in the field of motor vehicles in which the components used in the field are to have a low power consumption, for example, when a vehicle is parked, in order to avoid loading the vehicle battery excessively.

In order to be able to monitor the microcontroller in the state of low power consumption also, the TLE 6262 G transmits a "wakeup signal" to the microcontroller at regular intervals in the state with reduced power consumption. During the state with low power consumption, only the components of the TLE 6262 G that are necessary for transmitting the wakeup signal and, if appropriate, for switching over the circuit from the state of reduced power consumption into the normal operating state are active, in order to save power.

The microcontrollers that are used together with the TLE 6262 G are programmed in such a way that, when a wakeup signal is received, they carry out a functional test and, if appropriate, check wakeup inputs of the microcontroller. These wakeup inputs may be connected, for example, to sensors on the vehicle doors or to the central locking system. If the microcontroller detects activation of the doors or of the central locking system via one of its wakeup inputs after a wakeup signal of the monitoring circuit, the microcontroller of the monitoring circuit signals that a changeover from the state with low power consumption to the normal operating state is to take place.

The functional capability of the microcontroller is not monitored in the state with reduced power consumption. The microcontroller reacts only if it detects a change at one of its wakeup inputs. A functional failure of the microcontroller cannot be detected.

SUMMARY OF THE INVENTION

It is accordingly an object of the invention to provide a circuit configuration for monitoring a microcontroller and a method for monitoring a microcontroller, which overcome the above-mentioned disadvantages of the prior art apparatus and methods of this general type.

In particular, it is an object of the invention to provide a circuit configuration and a method in which a microcontroller, which can assume at least one normal operating state and one state with reduced power consumption, is monitored even in the state with reduced power consumption.

With the foregoing and other objects in view there is provided, in accordance with the invention, a circuit configuration for monitoring a micro-controller. The circuit configuration includes a watchdog circuit for assuming a first state or a second state as a function of a state signal. The watchdog circuit includes a first output for providing a wakeup signal, a second output for providing a reset signal, a first input for obtaining a first status signal, and a second input for obtaining a second status signal. The reset signal is dependent on the first status signal in the first state of the watchdog circuit and on the second status signal in the second state of the watchdog circuit.

With the foregoing and other objects in view there is provided, in accordance with the invention, a method for monitoring a microcontroller having at least one normal operating state and one state with a reduced power consumption. The method includes steps of: during the normal operating state, receiving a status signal having pulses from the microcontroller and resetting the microcontroller if the pulses are not received within a predefined time pattern; and during the state with the reduced power consumption, transmitting a wakeup signal having a sequence of pulses to the microcontroller, and resetting the microcontroller if there is no confirmation by the microcontroller within a predefined time interval after a pulse of the wakeup signal.

The state signal that places the watchdog circuit in the first or second state functions in accordance with whether the monitoring circuit is in a normal operating state or in a state with reduced power consumption. This state is predefined, for example, by way of the connected microcontroller.

In the normal operating state, the watchdog circuit preferably functions as a conventional watchdog circuit. That is to say, status signals are received by the microcontroller, and the microcontroller is reset by the watchdog circuit if no status signal is received within a time window predefined by the watchdog.

The circuit configuration permits the micro-controller to be monitored even in the state with reduced power consumption. The microcontroller is preferably reset if no status signal is received within a predefined time period after the outputting of a wakeup signal to the microcontroller.

In one embodiment of the invention, the circuit configuration has an input and output interface via which data is exchanged between the microcontroller and the monitoring circuit configuration and via which the status signals of the microcontroller are received during the normal operating state.

Furthermore, the circuit configuration has a switch that is driven in a clock fashion in accordance with a signal which is present at a drive input of the circuit configuration and which can be used to drive a load. The drive signal is supplied by the microcontroller to which the drive input is connected. In one embodiment, the status signal, which is fed to the second input of the watchdog circuit and in accordance with which the microcontroller is reset during the state with reduced power consumption, is tapped at this drive input. For this purpose, the signal that is present at this drive input is fed to the switch or to the second input of the watchdog circuit in accordance with the state signal. Use is made of the fact that, during the state with reduced power consumption, the switch is not to be driven, and the microcontroller is programmed in such a way that it supplies the status signal to the drive input for the switch during the state with reduced power consumption. This status signal can be made available to the drive input with a smaller amount of expenditure of power than when this status signal is made available at the input and output interface, which usually has a plurality of terminals, for example, an input, an output, a clocking terminal and a chip select terminal, which have to be driven.

The method, for monitoring a microcontroller that can assume at least one normal operating state and a state with reduced power consumption, includes during the normal operating state, for a status signal which has pulses to be received by the microcontroller and for the micro-controller to be reset if the monitoring pulses are not received within a predefined time pattern. During the state with reduced power consumption there is provision for a wakeup signal that has a sequence of clock pulses to be transmitted to the microcontroller, and for the microcontroller to be reset if no status signal of the microcontroller is received within a predefined time interval after a clock pulse of the wakeup signal.

Other features which are considered as characteristic for the invention are set forth in the appended claims.

Although the invention is illustrated and described herein as embodied in a circuit configuration and method for monitoring a micro-controller, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of a monitoring circuit connected to a microcontroller;

FIG. 2 is a block circuit diagram of an embodiment of the watchdog circuit illustrated in FIG. 1; and FIGS. 3A and 3B are graphs of selected signals from the circuits shown in FIGS. 1 and 2.

DESCRIPTION OF THE PREFERRED EMBODIMENTS

In the figures, unless stated otherwise, identical reference symbols designate identical parts with the same meaning.

Referring now to the figures of the drawing in detail and first, particularly, to FIG. 1 thereof, there is shown a block circuit diagram of an embodiment of a circuit configuration for monitoring a microcontroller μC. The circuit configuration includes a watchdog circuit WDL which has a first input E1 for feeding a first status signal TR, a second input E2 for feeding a second status signal PWMS1, an output A1 for providing a wakeup signal WS', and an output A2 for providing a reset signal RO.

The wakeup signal WS' drives a switch HS3 which pulls the potential at an output OUTH3 of the circuit configuration to a high level or a low level in accordance with the wakeup signal WS'. A signal which is present at the output OUTH3 is used as a wakeup signal WS for the microcontroller μC.

The circuit configuration also includes an input and output interface SPI which has, in the exemplary embodiment, a clock input CLK, a select input CSN, a data-inputting input DI and a data-outputting output DO, which are each connected to the microcontroller μC. This input and output interface SPI is, for example, an input and output interface which has already been described in the specification of TLE 6262 G and to which in each case data words with a length of 16 bits are fed or from which in each case data words with a length of 16 bits are output.

The input and output interface SPI is connected to a state logic device ML which makes available a state signal SLEEP which indicates which operating state the microcontroller μC and the circuit configuration which monitors the microcontroller μC are to assume. The state is predefined by the microcontroller μC and signaled to the circuit configuration by way of the input and output interface SPI.

The first status signal TR that is present at the first input E1 of the watchdog circuit WDL is also made available by the input and output interface SPI with reference to the data transmitted by the micro-controller μC.

The status signal PWMS1 that is present at the second input E2 of the watchdog circuit WDL is derived from a signal which is provided at an input PWM by the microcontroller μC. This input PWM is used, during a normal operating state of the circuit configuration and of the microcontroller μC, to drive a high side switch HS1 (illustrated only schematically in FIG. 1) whose output is connected to an output terminal OUTH1 of the circuit configuration and which is used to drive a load (not illustrated in more detail). The signal which is present at this input PWM is fed to a multiplexer MUX1 which feeds this signal either to the high side switch HS1 or to the watchdog circuit WDL in accordance with the state signal SLEEP.

The circuit configuration for monitoring the micro-controller μC and the microcontroller μC can assume at least one normal operating state and at least one operating state with reduced power consumption. These operating states are predefined by the micro-controller μC and are signaled to the circuit configuration via the input and output interface SPI. During the normal operating state, the reset signal RO is generated as a function of the first status signal TR which is made available via the input and output interface SPI. The signal TR results from a signal which the micro-controller transmits regularly via the interface SPI in the normal operating state in order to show its functional capability. During the state with reduced power consumption, the reset signal RO is generated as a function of the second status signal PWMS1 and the wakeup signal WS', as will be explained below.

FIG. 2 shows a block circuit diagram of an exemplary embodiment of the watchdog circuit illustrated in FIG. 1. This watchdog circuit includes a first watchdog WD1 to which the first status signal TR is fed, and a second watchdog WD2 to which the second status signal PWMS1 is fed. The two watchdogs WD1, WD2 are each fed an oscillator signal OS1, OS2 that is supplied by an oscillator OSC. These two oscillator signals OS1, OS2 are able to have the same frequency or a different frequency. The oscillator OSC also supplies the wakeup signal WS' that is also fed to the second watchdog WD2.

The first watchdog WD1 supplies a first reset signal RO1 as a function of the first status signal TR, and the second watchdog WD2 supplies a second reset signal RO2 as a function of the second status signal PWMS1 and the wakeup signal WS'. These two reset signals are fed to a multiplexer MUX2 which passes on one of these two reset signals RO1, RO2 to the output RO in accordance with the state signal SLEEP. The state signal SLEEP and the multiplexer MUX2 are matched to one another in such a way that, in the case of a state signal SLEEP that is assigned to a state with reduced power consumption, the second reset signal RO2 is passed on to the output RO, and that, in the case of a state signal SLEEP that is assigned to a normal operating state, the reset signal RO1 is passed on to the output RO.

The method of functioning of the watchdog WD1 that monitors the microcontroller μC during the normal operating state will be explained below with reference to FIG. 3a.

The microcontroller μC is programmed in such a way that it outputs a status signal to the monitoring circuit via the input and output interface SPI at regular time intervals during the normal operating state. The input and output interface outputs this received signal to the watchdog circuit WDL as a first status signal TR. For example, words with a length of 16 bits are fed in each case to the input and output interface, and the status bit or the status information is, for example, always contained in the same bit of the received data word and is converted into a two-value status signal TR by the input and output interface SPI. When the microcontroller μC functions correctly, the status signal has pulses at regular time intervals.

The first watchdog WD1 generates a time pattern internally as a function of the oscillator signal OS1. This time pattern is in the form of a sequence of what are referred to as open windows OW and closed windows CW. The open windows are each of the same length. The watchdog WD1 monitors the timing position of the pulses of the first status signal TR and generates a reset pulse as soon as a status pulse is received within a closed window CW. The deviation of this status pulse from the usual timing position points to a fault in the microcontroller μC so that the latter is reset by the reset signal RO1 that is fed to the reset output via the multiplexer MUX2.

The method of functioning of the second watchdog WD2 that monitors the functioning of the microcontroller μC during the operation with reduced power consumption is explained below with reference to FIG. 3b.

During this operating state, wakeup pulses are output via the output OUTH3 to the microcontroller μC at regular time intervals. In response, the microcontroller μC tests its internal functions and checks the signals present at its wakeup inputs WK1, WK2, WK3. If the microcontroller μC functions without faults here and if no wakeup signal is detected at one of the wakeup inputs WK1, WK2, WK3, the microcontroller outputs a status signal to the drive input PWM of the monitoring circuit during the state with reduced power consumption. This status pulse is fed as signal PWMS1 to the second watchdog WD2 via the multiplexer MUX1. The second watchdog WD2 monitors the presence of a pulse of this second status signal PWMS1 within a time window tw after the wakeup signal WS, WS'. If such a pulse of the second status signal PWMS1 is present, no reset pulse for the microcontroller μC is generated. If no such status pulse is present within this time window tw, as apparent from the second time window illustrated in FIG. 3b, a reset pulse RO2 is generated in order to reset the microcontroller μC. The reset signal RO2 is fed to the reset output via the multiplexer.

If the microcontroller μC detects a wakeup signal at one of its inputs WK1, WK2, WK3 during the state with reduced power consumption after a wakeup pulse of the watchdog circuit WDL, the microcontroller μC passes on to the monitoring circuit, via the input and output interface SPI, the information indicating that a changeover is to take place from the state with reduced power consumption into the normal operating state, as a result of which the state logic device ML changes the state signal SLEEP. When the switch is applied in a motor vehicle, the wakeup inputs WK1, WK2, WK3 of the microcontroller can be connected, for example, to sensors on doors of the motor vehicle in order to wake up the circuit, for example when the doors open, that is to say to change it into the normal operating state.

It is to be noted that the monitoring circuit and the microcontroller may of course also assume more than only two states. However, the essential feature is that, in the monitoring circuit, the microcontroller μC continues to be monitored during a state with reduced power consumption in that wakeup pulses are transmitted to the micro-controller μC at regular time intervals and the micro-controller is reset if no status signal is supplied back by the microcontroller μC within a predefined time window after such a wakeup pulse has been output.

The fact that the input PWM of the monitoring circuit which actually serves to drive the high side switch HS1 is used to receive the status signal during the state with reduced power consumption brings about an additional saving in power as the potential of only one terminal can be changed in order to signal to this input whereas the potentials have to be changed at a plurality of terminals when communication takes place via the input and output interface.

During the state with reduced power consumption, there are two states in the monitoring circuit and in the microcontroller μC. A first state is present after a wakeup pulse has been transmitted to the microcontroller μC and the system waits for the response of the micro-controller. A second state is present after a response has been received from the microcontroller μC. In the second state the circuit is in the state with minimum power consumption until the next wakeup pulse is transmitted to the microcontroller μC and its response is waited for.

As has already been explained, the monitoring circuit can be changed over by the microcontroller μC from the state with reduced power consumption into the normal operating state by way of the input and output interface SPI.

To conclude it is noted that in one embodiment of the invention, this changeover of states can also take place by way of a further input WK of the monitoring circuit. This input WK is connected to the state logic device ML.

We claim:

1. A circuit configuration for monitoring a micro-controller, comprising:
   a watchdog circuit for assuming a first state or a second state as a function of a state signal;
   said watchdog circuit including a first output for providing a wakeup signal, a second output for providing a reset signal, a first input for obtaining a first status signal, and a second input for obtaining a second status signal; and
   the reset signal being dependent on the first status signal in the first state of said watchdog circuit and on the second status signal in the second state of said watchdog circuit.

2. The circuit configuration according to claim 1, wherein said watchdog circuit is configured to generate said reset signal in the second state if a predefined state of the second status signal is not present at said second input within a time window predefined by the wakeup signal.

3. The circuit configuration according to claim 1, further comprising:
   a switch; and
   a drive input for obtaining a drive signal and for feeding the drive signal to said switch or to said second input of said watchdog circuit dependent on the state signal.

4. The circuit configuration according to claim 1, wherein said watchdog circuit is configured to generate said reset signal in the second state if a predefined state of the first status signal is not present at said first input within a predefined time window.

5. The circuit configuration according to claim 4, further comprising an input and output interface; said interface connected to said first input of said watchdog circuit for obtaining the first status signal.

6. The circuit configuration according to claim 1, further comprising a state logic device for providing the state signal.

7. The circuit configuration according claim 6, further comprising:
   an input and output interface, said interface connected to said first input of said watchdog circuit for obtaining the first status signal;
   said state logic device connected to said interface.

8. A method for monitoring a microcontroller having at least one normal operating state and one state with a reduced power consumption, the method which comprises:
   during the normal operating state, receiving a status signal having pulses from the microcontroller and resetting the microcontroller if the pulses are not received within a predefined time pattern; and
   during the state with the reduced power consumption, transmitting a wakeup signal having a sequence of pulses to the microcontroller, and resetting the microcontroller if there is no confirmation by the microcontroller within a predefined time interval after a pulse of the wakeup signal.

* * * * *